(12) United States Patent
Niitsuma

(10) Patent No.: US 9,101,121 B2
(45) Date of Patent: Aug. 11, 2015

(54) SPOOL BRAKE DEVICE FOR DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 72 days.

(21) Appl. No.: 13/967,846

(22) Filed: Aug. 15, 2013

(65) Prior Publication Data

US 2014/0110517 A1    Apr. 24, 2014

(30) Foreign Application Priority Data

Oct. 19, 2012 (JP) .................................. 2012-231531

(51) Int. Cl.
*A01K 89/0155* (2006.01)

(52) U.S. Cl.
CPC .............................. *A01K 89/01555* (2013.01)

(58) Field of Classification Search
USPC .................................. 242/223, 288, 305, 309
See application file for complete search history.

(56) References Cited

U.S. PATENT DOCUMENTS

| | | | | |
|---|---|---|---|---|
| 5,440,831 A * | 8/1995 | Chandler | ..................... | 43/43.11 |
| 5,833,156 A | 11/1998 | Park et al. | | |
| 6,045,076 A | 4/2000 | Daniels | | |
| 6,412,722 B1 | 7/2002 | Kreuser et al. | | |
| 6,584,722 B1 * | 7/2003 | Walls et al. | ......................... | 43/4 |
| 6,591,222 B2 * | 7/2003 | Stiner | ........................... | 702/173 |
| 6,973,999 B2 * | 12/2005 | Ikuta et al. | ..................... | 188/161 |
| 6,983,907 B2 * | 1/2006 | Ikuta et al. | ..................... | 242/288 |
| 7,108,213 B2 * | 9/2006 | Hitomi et al. | .................. | 242/223 |
| 7,461,805 B2 * | 12/2008 | Ikuta et al. | ..................... | 242/223 |
| 7,503,517 B2 * | 3/2009 | Ikuta et al. | ..................... | 242/288 |
| 7,712,695 B2 * | 5/2010 | Yusa et al. | ..................... | 242/289 |
| 8,844,855 B2 * | 9/2014 | Niitsuma et al. | .............. | 242/288 |
| 2002/0053617 A1 * | 5/2002 | Nanbu | .......................... | 242/223 |
| 2004/0124297 A1 * | 7/2004 | Steer | ............................ | 242/223 |
| 2005/0133650 A1 * | 6/2005 | Stiner et al. | ................... | 242/223 |
| 2006/0091250 A1 * | 5/2006 | Nishimura | .................... | 242/223 |
| 2010/0006686 A1 | 1/2010 | Yusa et al. | | |

FOREIGN PATENT DOCUMENTS

| | | |
|---|---|---|
| JP | 11-103736 A | 4/1999 |
| JP | 4039951 B | 11/2007 |

OTHER PUBLICATIONS

European Search Report of corresponding EP Application No. 13 18 1109.3 dated Feb. 7, 2014.

* cited by examiner

*Primary Examiner* — Emmanuel M Marcelo
(74) *Attorney, Agent, or Firm* — Global IP Counselors

(57) ABSTRACT

A spool brake device for a dual-bearing reel includes a spool braking part, a spool controlling part, a water landing determination part, and a water landing informing part. The spool brake device is configured to brake a spool capable of winding thereabout a fishing line having a terminal tackle attached to a tip thereof. The spool braking part is configured to electrically brake the spool. The spool controlling part is configured to electrically control the spool braking part. The water landing determining part configured to determine whether or not the terminal tackle is in a water landing state indicating that the terminal tackle is in water. The water landing informing part is configured to inform of the water landing state of the terminal tackle when the water landing determining part determines that the terminal tackle is in the water landing state.

7 Claims, 8 Drawing Sheets

SPOOL BRAKE DEVICE FOR DUAL-BEARING REEL

CROSS-REFERENCE TO RELATED APPLICATIONS

This application claims priority to Japanese Patent Application No. 2012-231531 filed on Oct. 19, 2012, the entirety of which is hereby incorporated by reference in its entirety.

BACKGROUND OF THE INVENTION

1. Field of the Invention

The present invention relates to a brake device, particularly to a spool brake device for a dual-bearing reel, which is configured to electrically control braking force on a spool capable of winding a fishing line thereabout.

2. Background Art

A well-known dual-bearing reel is capable of electrically controlling a spool thereof (e.g., see Specification Japan Patent No. 4039951). A spool brake device for the well-known dual-bearing reel includes magnets, a coil and a brake device. The magnets are unitarily rotatable with the spool. The coil is disposed in opposition to the magnets within a reel unit. The control device is configured to regulate braking force by executing PWM (Pulse Width Modulation) with respect to current flowing through the coil. The brake device is configured to control the braking force in accordance with tension by software. The well-known spool brake device is configured to finish a brake control when the rotational speed of the spool becomes a predetermined speed or less in a third brake processing at the latter stage of casting.

SUMMARY

When the well-known spool brake device is used, it is more difficult for an angler to recognize the water landing of a terminal tackle in such a condition that the terminal tackle is invisible, for instance, in long distance surfcasting or in fishing at night. When an angler cannot recognize the water landing of the terminal tackle, it is more difficult for the angler to perform a thumbing operation or a clutch-on operation in good timing.

It is an advantage of the present invention to produce a spool brake device for an electrically controllable dual-bearing reel, whereby an angler is enabled to easily recognize the water landing of a terminal tackle.

A spool brake device for a dual-bearing reel includes a spool braking part, a spool controlling part, a water landing determination part, and a water landing informing part. The spool brake device is configured to brake a spool capable of winding thereabout a fishing line having a terminal tackle attached to a tip thereof. The spool braking part is configured to electrically brake the spool. The spool controlling part is configured to electrically control the spool braking part. The water landing determining part configured to determine whether or not the terminal tackle is in a water landing state indicating that the terminal tackle is in water. The water landing informing part is configured to inform of the water landing state of the terminal tackle when the water landing determining part determines that the terminal tackle is in the water landing state.

BRIEF DESCRIPTION OF THE DRAWINGS

Referring now to the attached drawings which form a part of this original disclosure.

DETAILED DESCRIPTION OF THE EMBODIMENTS

Reel Structure

Figure 1:
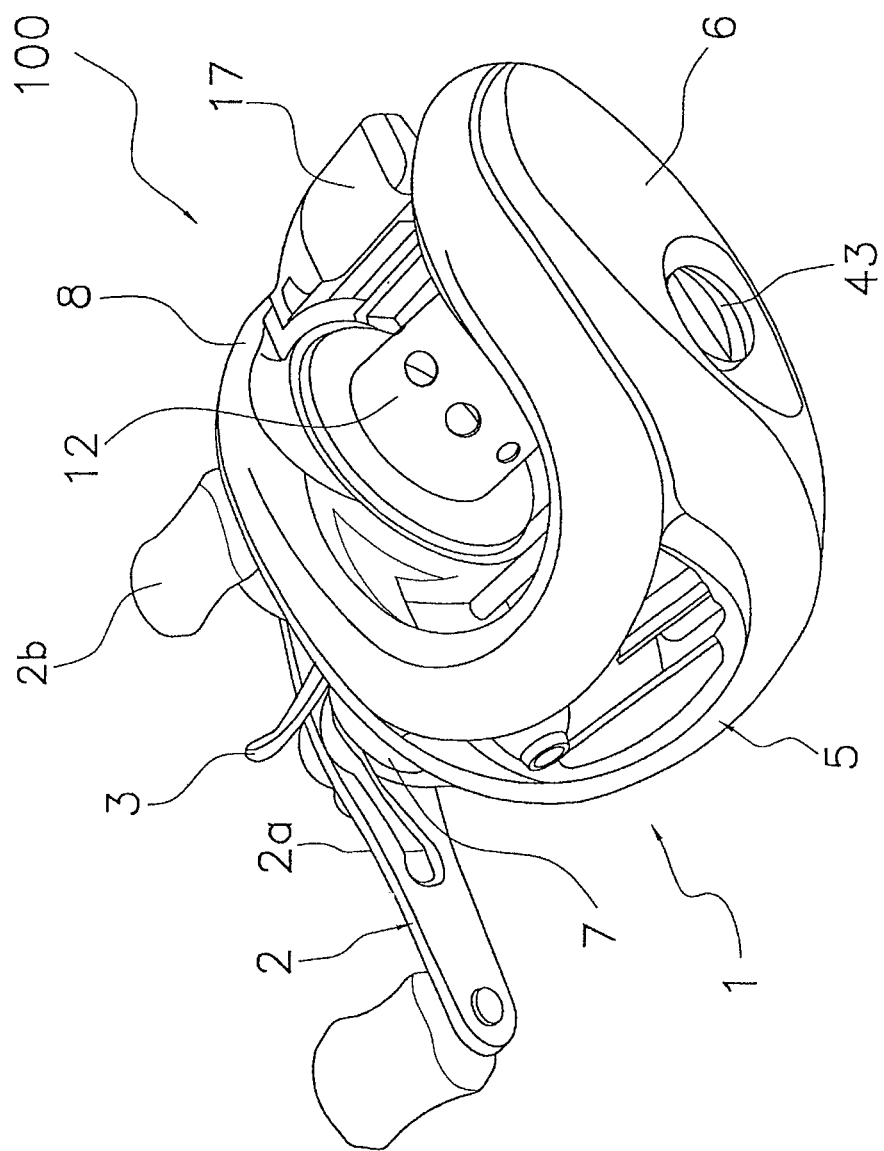
FIG. 1 is a perspective view of a dual-bearing reel employing an exemplary embodiment of the present invention.
Figure 2:
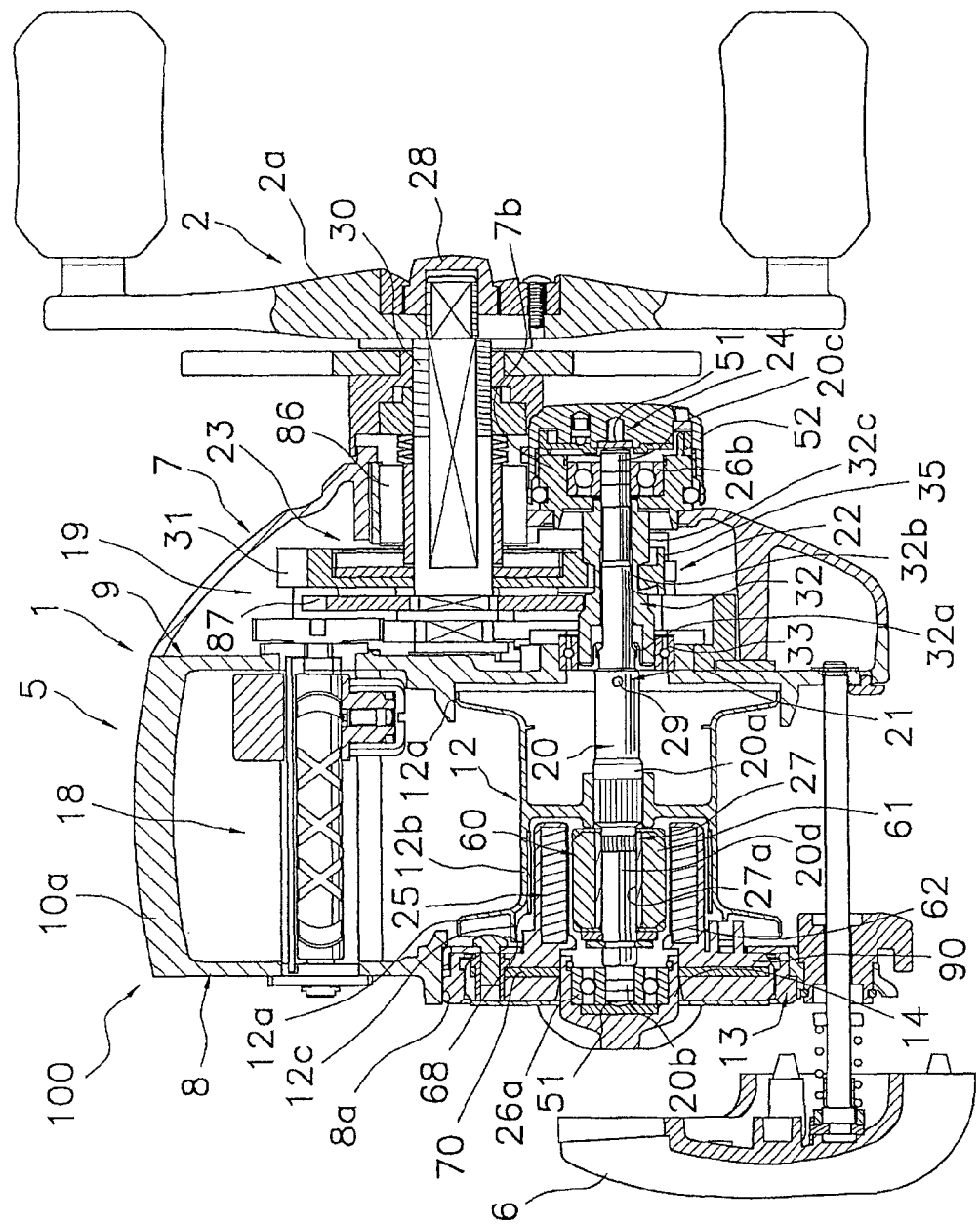
FIG. 2 is a cross-sectional view of an inside structure of a reel unit.

FIGS. 1 and 2 illustrate a dual-bearing reel 100 according to an exemplary embodiment of the present invention. The dual-bearing reel 100 is a low-profile dual-bearing reel for bait casting. The dual bearing reel 100 includes a reel unit 1, a handle 2 and a star drag 3. The handle 2 for spool rotation is disposed on a lateral side of the reel unit 1. The star drag 3 for drag regulation is disposed on the reel unit side of the handle 2.

The handle 2 is of a double-handle type and includes an arm 2a and knobs 2b rotatably attached on the both ends of the arm 2a. As illustrated in FIG. 2, the arm 2a is non-rotatably attached to a tip of a handle shaft 30, and is fixed thereto by a nut 28.

The reel unit 1 is a member made of light metal such as magnesium alloy. The reel unit 1 includes a frame 5, a first side cover 6, and a second side cover 7. The first side cover 6 and the second side cover 7 are attached to the both lateral sides of the frame 5. A spool 12 for winding a fishing line is rotatably attached to the inside of the reel unit 1 through a spool shaft 20 (see FIG. 2).

As illustrated in FIG. 2, the frame 5 accommodates the spool 12, a clutch lever 17 (see FIG. 1) and a level winding mechanism 18. The clutch lever 17 serves as a thumb pad in thumbing the fishing line. The level winding mechanism 18 is configured to uniformly wind the fishing line around the spool 12. Further, a gear mechanism 19, a clutch mechanism 21, a clutch control mechanism 22, a drag mechanism 23, and a casting control mechanism 24 are disposed between the frame 5 and the second side cover 7. The gear mechanism 19 is configured to transfer rotational force from the handle 2 to the spool 12 and the level winding mechanism 18. The clutch mechanism 21 is configured to couple/decouple the spool 12 and the handle 2. The clutch control mechanism 22 is configured to control the clutch mechanism 21 in response to an operation of the clutch lever 17. The drag mechanism 23 is configured to brake the spool 12. The casting control mechanism 24 is configured to regulate resistive force produced when the spool 12 is rotated. Further, an electrically controlled spool brake mechanism 25 (an example of a spool brake device) is disposed between the frame 5 and the first side cover 6. The spool brake mechanism 25 is configured to inhibit occurrence of backlash in casting a fishing rod.

The frame 5 includes a first side plate 8, a second side plate 9, and a plurality of coupling portions 10a. The first and second side plates 8 and 9 are disposed in opposition to each other at a predetermined interval. The coupling portions 10a integrally couple the first side plate 8 and the second side plate 9. The first side plate 8 has a circular opening 8a. A spool support part 13, which forms a part of the reel unit 1, is detachably fixed to the opening 8a. The spool support part 13 has a bearing accommodation portion 14 to accommodate a first bearing 26a for supporting an end of the spool 12. The spool support part 13 has a male threaded portion to be screwed into a female threaded portion formed in the opening 8a. The spool support part 13 is thus screwed and fixed to the opening 8a.

The spool 12 has a pair of flanges 12a and a bobbin trunk 12b. The flanges 12a are saucer-shaped portions disposed on the both lateral parts of the spool 12. The bobbin trunk 12b is a tubular portion disposed between the both flanges 12a. To prevent the fishing line from getting stuck, the outer peripheral surface of the left-side flange 12a (see FIG. 2) is disposed on the inner peripheral side of the opening 8a at a slight clearance. The spool 12 is non-rotatably fixed to the spool shaft 20 penetrating through the inner periphery of the bobbin trunk 12b by, for instance, serration coupling.

The spool shaft 20 is made of non-magnetic metal such as SUS304. The spool shaft 20 is extending to the outside of the second side cover 7 while penetrating through the second side plate 9. The extending end (i.e., one end) of the spool shaft 20 is rotatably supported by a boss 7b attached to the second side cover 7 through a second bearing 26b. On the other hand, the other end of the spool shaft 20 is rotatably supported by the first bearing 26a. The spool shaft 20 has a large-diameter portion 20a, a first small-diameter portion 20b, and a second small-diameter portion 20c. The large-diameter portion 20a is formed in the center part of the spool shaft 20. The first and second small-diameter portions 20b and 20c are formed on the both ends of the spool shaft 20. The first small-diameter portion 20b is supported by the first bearing 26a, while the second small-diameter portion 20c is supported by the second bearing 26b. In should be noted that the first and second bearings 26a and 26b are roller bearings. Each of the first and second bearings 26a and 26b includes a roller member, an inner race, and an outer race. These members are made of SUS404, and their surfaces are reformed for enhancing corrosion resistance of the first and second bearings 26a and 26b.

Further, a magnet attachment portion 20d is formed between the large-diameter portion 20a and the left-side first small-diameter portion 20b (see FIG. 2). The magnet attachment portion 20d has an outer diameter greater than that of the first diameter portion 20b and less than that of the large-diameter portion 20a. Magnets 61 to be described are attached to the magnet attachment portion 20d. A magnet holding portion 27 is non-rotatably fixed to the magnet attachment portion 20d by, for instance, serration coupling. For example, the magnet holding portion 27 is made of magnetic material obtained by performing electroless nickel plating with respect to the surface of iron material such as SUM (extrusion and cutting). The magnet holding portion 27 is a quadratic prism member with a square cross-section. The magnet holding portion 27 has a through hole 27a in the center part thereof. The magnet attachment portion 20d penetrates the through hole 27a. The fixation method of the magnet holding portion 27 is not limited to serration coupling, and a variety of coupling methods (e.g., key coupling, splined coupling, etc.) can be used as the fixation method.

The right end of the large-diameter portion 20a of the spool shaft 20 is disposed in the through-hole part of the second side plate 9. An engaging pin 29 is fixed to the right end of the large-diameter portion 20a. The engaging pin 29 forms a part of the clutch mechanism 21. Further, the engaging pin 29 penetrates through the large-diameter portion 20a along its diameter. The both axial ends of the engaging pin 29 are radially protruding from the large-diameter portion 20a.

As illustrated in FIG. 1, the clutch lever 17 is disposed behind the spool 12 while being disposed on the rear part of the space interposed between the first and second side plates 8 and 9. The clutch lever 17 is coupled to the clutch control mechanism 22. The clutch lever 17 is configured to be slid up and down between the first and second side plates 8 and 9 for switching the clutch mechanism 21 between a coupled state and a decoupled state.

The gear mechanism 19 includes the handle shaft 30, a drive gear 31, and a pinion gear 32. The drive gear 31 is fixed onto the handle shaft 30. The pinion gear 32 is formed in a tubular shape and is meshed with the drive gear 31. The handle shaft 30 is rotatably attached to the second side plate 9 and the second side cover 7. The handle shaft 30 is prevented from rotating in a fishing-line releasing direction (i.e., reversing) by a roller-type one-way clutch 86 and a pawl-type one-way clutch 87. The one-way clutch 86 is attached between the second side cover 7 and the handle shaft 30. The drive gear 31 is rotatably attached to the handle shaft 30, and is coupled to the handle shaft 30 through the drag mechanism 23.

The pinion gear 32 is a tubular member that the spool shaft 20 penetrates through the center part thereof. The pinion gear 32 is extending inwards from the outside of the second side plate 9. The pinion gear 32 is attached onto the spool shaft 20 while being axially movable. Further, the left end (see FIG. 2) of the pinion gear 32 is supported by the second side plate 9 through a bearing 33 while being rotatable and axially movable. The pinion gear 32 has an engaged groove 32a on the left end thereof (see FIG. 2). The engaged groove 32a is engaged with the engaging pin 29. The engaged groove 32a and the engaging pin 29 form the clutch mechanism 21. Further, the pinion gear 32 has a narrowed portion 32b in the axially intermediate part thereof. Yet further, the pinion gear 32 has a gear portion 32c on the right end thereof. The gear portion 32c is meshed with the drive gear 31.

The clutch control mechanism 22 includes a clutch yoke 35. The clutch yoke 35 is configured to be moved along the axial direction of the spool shaft 20. The clutch control mechanism 22 further includes a clutch return mechanism (not illustrated in the figures). The clutch return mechanism is configured to turn on the clutch mechanism 21 (i.e., a clutch-on state) in conjunction with the rotation of the spool 12 in the fishing-line winding direction.

The casting control mechanism 24 includes a plurality of friction plates 51 and a brake cap 52. The friction plates 51 abut to the both ends of the spool shaft 20 from the axially outside of the spool shaft 20. The brake cap 52 is configured to regulate the abutting pressure of the friction plates 51 against the spool shaft 20. The left-side friction plate 51 is attached to the inside of the spool support part 13.

Structure of Spool Brake Mechanism

Figure 3:
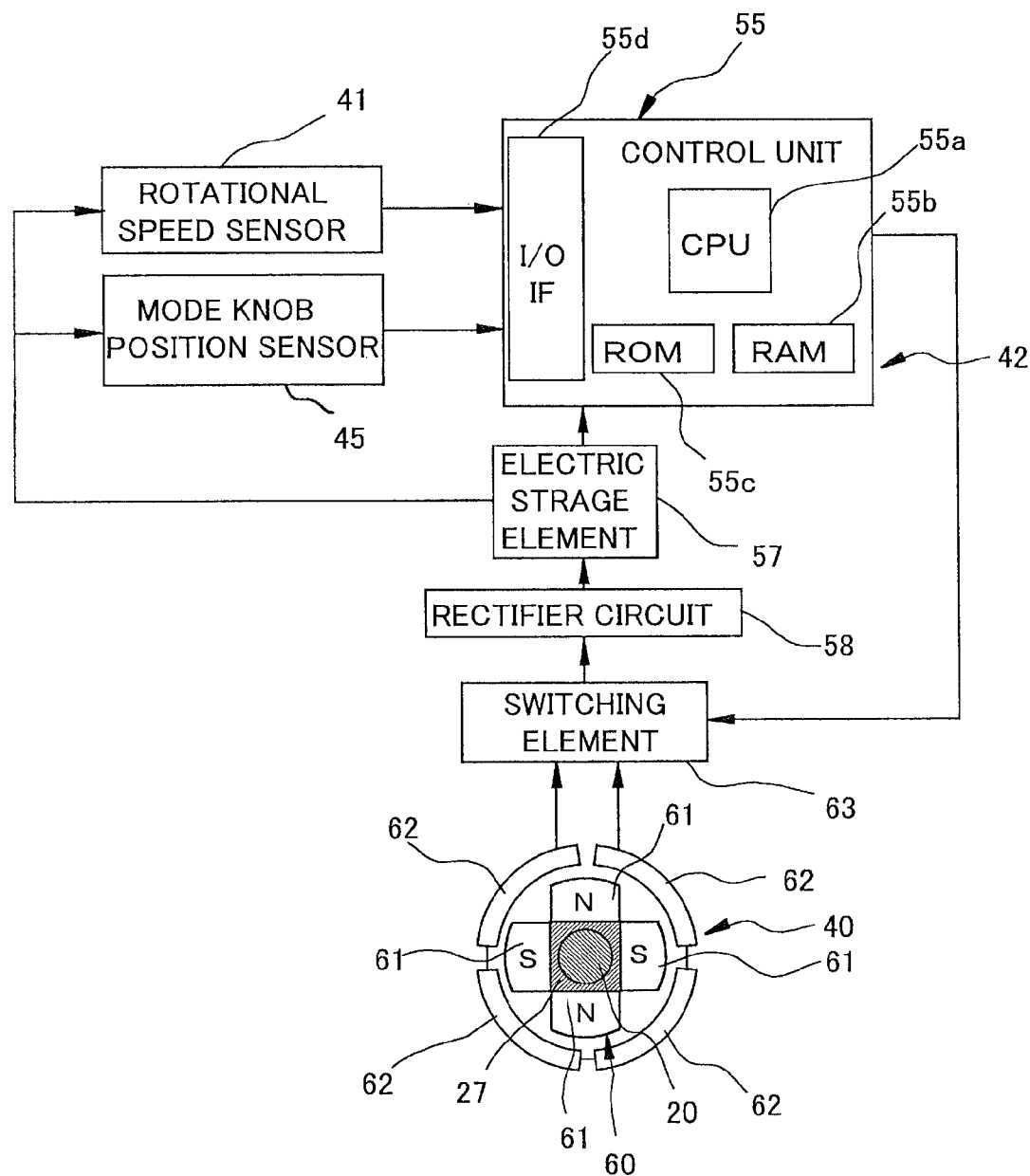
FIG. 3 is a block diagram for representing a configuration of a spool brake device.

As illustrated in FIG. 3, the spool brake mechanism 25 includes a spool brake unit 40 (an example of a spool braking part), a rotational speed sensor 41 (an example of a rotational speed detecting part), a spool control unit 42 and the mode knob 43. The spool brake unit 40 is disposed in the spool 12 and the reel unit 1. The rotational speed sensor 41 is disposed for detecting the rotational speed of the spool 12 and the tension on the fishing line. The spool control unit 42 is configured to control the spool brake unit 40. The mode knob 43 is disposed for selecting any one of four brake modes, which will be described hereinafter, for controlling the spool brake unit 40.

The spool brake unit 40 is an electrically controllable unit configured to brake the spool 12 by electric generation. The spool brake unit 40 includes a rotor 60, a plurality of (e.g., four) coils 62 and a switching element 63. The rotor 60 includes a plurality of (e.g., four) magnets 61. The magnets 61 are disposed in alignment in the rotational direction of the spool shaft 20. The coils 62 are connected in series while being disposed in opposition to each other on the outer peripheral side of the rotor 60. The switching element 63 is an element to which the both ends of the plural series-connected coils 62 are connected. To brake the spool 12, the spool brake unit 40 is configured to change a duty cycle by causing the switching element 63 to turn on/off the electric current generated by the relative rotation between the magnets 61 and the coils 62. The braking force to be generated by the spool brake unit 40 is increased in proportion to the length of the on-time of the switching element 63 (i.e., in proportion to the magnitude of the duty cycle).

The four magnets 61 of the rotor 60 are aligned in the circumferential direction of the rotor 60. Polarities of the adjacent magnets 61 are different from each other. Each magnet 61 is a member having a length roughly the same as that of the magnet holding portion 27. The inner surface of each magnet 61 is flat, while the outer surface thereof has a circular-arc cross-section. Each magnet 61 is disposed while the inner surface thereof makes contact with the outer peripheral surface of the magnet holding portion 27 of the spool shaft 20.

As illustrated in FIG. 2, a sleeve 68 is mounted to the inner peripheral surface of the bobbin trunk 12b while being opposed to the magnets 61. For example, the sleeve 68 is a magnetic member formed by performing the electroless nickel plating with respect to the surface of iron material such as SUM (extrusion and cutting). The sleeve 68 is fixed to the inner peripheral surface of the bobbin trunk 12b by arbitrary fixing means (e.g., press-fitting, bonding, etc.). When thus structured magnetic sleeve 68 is disposed in opposition to the magnets 61, the magnetic flux from the magnets 61 concentrates in and passes through the coils 62. Accordingly, electric generation efficiency and brake efficiency will be enhanced.

Coreless coils are used as the coils 62 for preventing cogging and thereby smoothly rotating the spool 12. Further, the coils 62 are not provided with a yoke. Wires of the coils 62 are respectively wound in a roughly rectangular shape. The wound wires are opposed to the magnets 61 while being disposed within the magnetic field of the magnets 61. The four coils 62 are connected in series while the both ends thereof are connected to the switching element 63. The coils 62 are disposed substantially concentrically to the axis of the spool 12 while being respectively curved in a circular-arc shape along the rotational direction of the spool 12. Accordingly, a roughly constant distance is produced between the coils 62 and the outer surfaces of the magnets 61. In other words, it is possible to keep a constant clearance between the coils 62 and the magnets 61 set in a rotary motion. The coils 62 are also mounted to a circuit board 70 to be described.

The switching element 63 has two FETs (Field Effect Transistors) 63a. For example, the FETs 63a are parallel-connected and are capable of executing a high-speed on/off control. The series-connected coils 62 are connected to the respective drain terminals of the FETs 63a. The switching element 63 is also mounted to the circuit board 70.

The rotational speed sensor 41 uses, for instance, a photoelectric switch. The photoelectric switch is of a light emission-receipt type including a light emitter and a light receiver. The flange 12a of the spool 12, which is opposed to the circuit board 70, has a detection tubular portion 12c integrally formed on the outer surface thereof. The detection tubular portion 12c has a plurality of slits disposed at intervals along the rotational direction. In the rotational speed sensor 41, the light emitter and the light receiver are disposed in opposition to each other through the detection tubular portion 12c. With the structure, the rotation sensor 41 is configured to detect the rotational speed of the spool 12 by light passing through the slits.

The mode knob 43 is provided for selecting any one of the four brake modes. Specifically, the four brake modes are L-mode (long distance mode), M-mode (medium distance mode), A-mode (all-round mode), and W-mode (wind mode). First and second braking forces to be described are set for each of the four brake modes. Here, the first braking forces for the four modes are different from each other. Likewise, the second braking forces for the four modes are different from each other.

Now, the L-mode is a long distance mode used for performing super-distance surf-casting in a preferable downwind condition while the fishing line with low specific gravity and a heavy terminal tackle (lure) with less air resistance (e.g., a spoon lure, a metal jig, a vibration lure, etc.) are used. The L-mode is a brake mode configured to prolong the flying distance of the terminal tackle by maximally using energy immediately after casting, maximally increasing the maximum number of rotations per unit time of the spool 12, and making the spool 12 almost freely rotate in the middle and subsequent stages of casting. The first braking force of the L-mode is set to be the smallest in the four brake modes.

The M-mode is a brake mode set for comfortably performing normal long distance surf-casting with a terminal tackle (plug) with less air resistance (e.g., a movable-centroid type plug, a pencil bait, a vibration plug, etc.). The M-mode is set for prolonging the flying distance of the terminal tackle while overrun is inhibited immediately after casting and backlash is narrowly prevented by appropriately correcting the rotation of the spool 12 in the middle and subsequent stages of casting. It is preferable to select the M-mode as the default mode when a polyamide resin fishing line with low specific gravity is used.

The A-mode is a brake mode set for maximally using energy immediately after casting and prolonging the flying distance of the terminal tackle in the later stage of casting. Regardless of a sort of fishing line, a sort of terminal tackle and a wind direction, the A-mode can be used versatilely in almost all the conditions. Especially, it is preferable to set the A-mode as the default mode when a fluorocarbon fishing line with high specific gravity is used.

The W-mode is a brake mode set for prolonging the flying distance of the terminal tackle by inhibiting backlash as much as possible even when the flying distance of the terminal tackle can be reduced in a completely upwind condition. The second braking force of the W-mode is set to be the largest among the four brake modes. The W-mode is set to be suitable for casting with a predetermined type of tackle that easily rotates and slows down in flying (e.g., a fixed-centroid type Minnow lure and a flat-side crankbait) in an upwind condition. Further, the W-mode is set for reliably preventing backlash even while the spool 12 is rotated at a low speed even in short-distance casting (e.g., pitching casting, skipping casting, etc.).

The mode knob 43 is rotatably mounted to the first side cover 6. The mode knob 43 can be positioned in any one of four rotation phases corresponding to the aforementioned four brake modes. The mode knob 43 is provided with a magnet (not illustrated in the figures). The circuit board 70 is provided with a mode knob position sensor 45. The mode knob position sensor 45 includes two hall elements. The hall elements are disposed in a circulation area of the magnet, and are separated away from each other. The mode knob position sensor 45 is configured to detect the rotation phase of the mode knob 43 based on on-off switching of the two hall elements caused by passing of the magnet. Specifically, the switching states of the hall elements include "a both-on state", "a one-on and the other-off state", "a one-off and the other-on state", and "a both-off state". A control unit 55 to be described is configured to set any one of the four brake modes in accordance with the detected rotation phase.

The spool control unit 42 includes the circuit board 70 and the control unit 55. The circuit board 70 is mounted to a surface of the spool support part 13, i.e., the surface opposed to the flange 12*a* of the spool 12. The control unit 55 is mounted to the circuit board 70.

The circuit board 70 is a ring-shaped washer-type board having a circular opening in the center thereof. The circuit board 70 is arranged substantially concentric to the spool shaft 20 while being disposed on the outer peripheral side of the bearing accommodating portion 14. The circuit board 70 is mounted to the spool support part 13 while being rotatable relatively thereto. Further, the circuit board 70 is positioned while being disposed at a predetermined phase with respect to the opening 8*a*. The circuit board 70 is thereby disposed at a constant phase even when the spool support part 13 is rotated and attached/detached to/from the opening 8*a*.

The circuit board 70 is herein mounted to the surface of the spool support part 13, i.e., the surface opposed to the flange 12*a* of the spool 12. Therefore, the coils 62, which are disposed about the rotor 60, can be directly attached to the circuit board 70. In other words, lead wires are not required for connecting the coils 62 and the circuit board 70. Therefore, it is possible to reduce chances of insulation failure between the coils 62 and the circuit board 70. In addition, the coils 62 are herein mounted to the circuit board 70 mounted to the spool support part 13. Therefore, only by attaching the circuit board 70 to the spool support part 13, the coils 62 are also attached to the spool support part 13. Thus, the spool brake mechanism 25 can be easily assembled. Further, the circuit board 70 is mounted to the spool support part 13 in a relatively rotatable state, while being positioned at a predetermined phase with respect to the opening 8*a*. Therefore, the phase between the circuit board 70 and the reel unit 1 is stationary. With the structure, even when the magnet is mounted to the mode knob 43 attached to the first side cover 6 configured to be opened and closed while the hall elements are mounted to the circuit board 70, the hall elements can always detect the magnet in the same positional relation.

The control unit 55 is implemented by a microcomputer embedded with, for instance, a CPU 55*a*, a RAM 55*b*, a ROM 55*c*, an I/O interface 55*d* and so forth. The ROM 55*c* of the control unit 55 (an example of a first braking force setting part, a second braking force setting part and a tension setting part) stores a control program, and also stores a variety of data (first braking force, second braking force, timer values, etc.) for two braking processing to be described in accordance with the respective four brake modes. Further, the ROM 55*c* stores setting values of tension (e.g., reference tension, start tension, etc.) in the respective brake modes, and so forth. The rotational speed sensor 41 and the mode knob position sensor 45 for detecting the rotational position of the mode knob 43 are connected to the control unit 55. Further, the gates of the respective FETs 63*a* of the switching element 63 are connected to the control unit 55. Based on the control program to be described and inputs from the rotational speed sensor 41 and the mode knob position sensor 45, the control unit 55 is configured to execute the on/off control of the switching element 63 of the spool brake unit 40 by, for instance, a PWM (Pulse Width Modulation) signal with a period of 1/1000 seconds. Specifically, the control unit 55 is configured to execute the on/off control of the switching element 63 at a duty cycle D, which decreases in proportion to the rotational speed, in a selected one of the brake modes. Power is supplied to the control unit 55 from an electric storage element 57 as a power source. The power is also supplied to the rotational speed sensor 41 and the mode knob position sensor 45. Further, the control unit 55 is configured to detect that the terminal tackle is in a water landing state. Yet further, when the terminal tackle is actually in the water landing state, the control unit 55 is configured to inform an angler of the state by sound.

Figure 4:
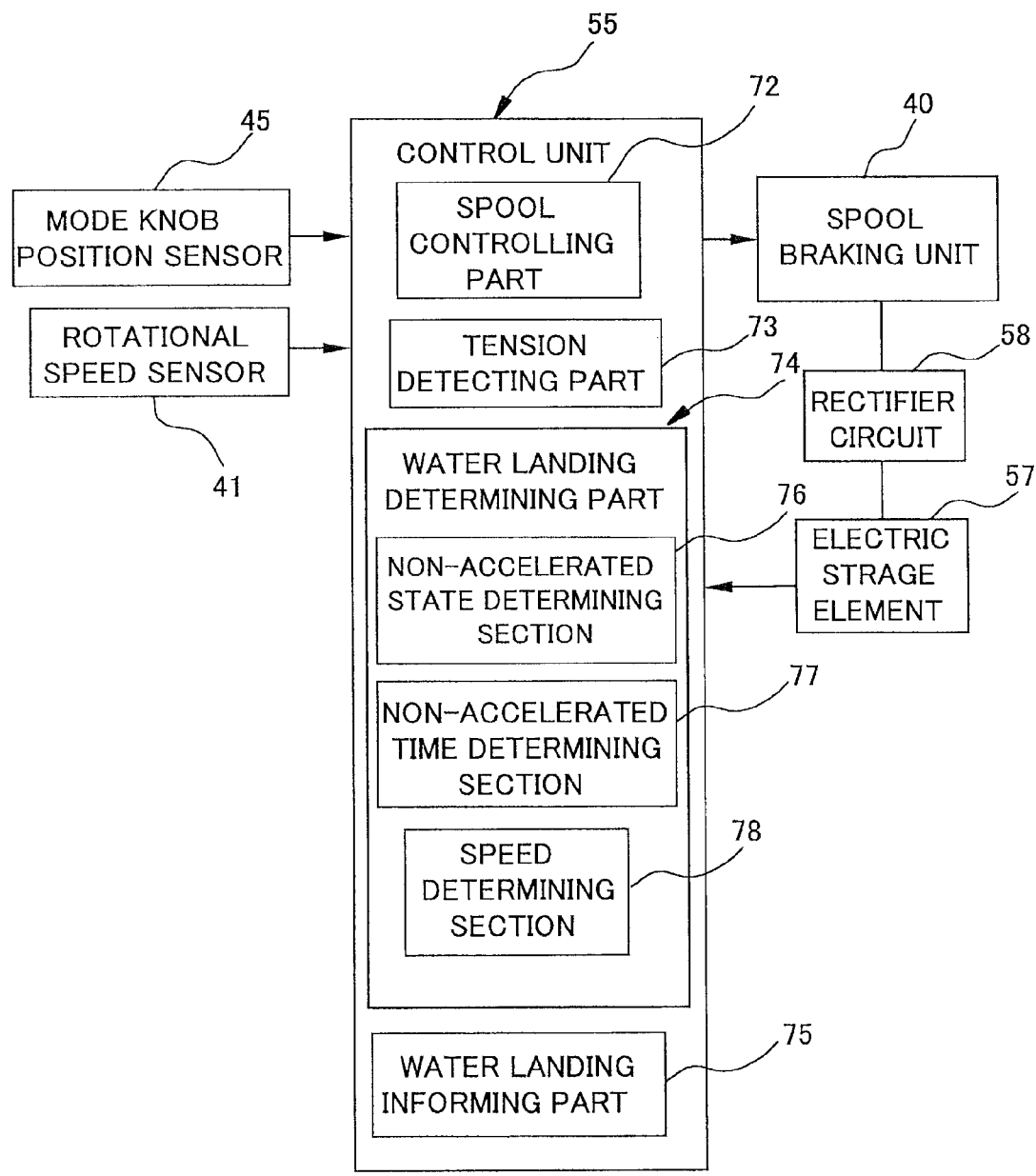
FIG. 4 is a block diagram for representing a functional configuration of a control unit.

As represented in FIG. 4, the control unit 55 includes a spool controlling part 72, a tension detecting part 73, a water landing determining part 74, and a water landing informing part 75 as functional components to be implemented by software. The spool controlling part 72 is configured to execute a braking processing represented in FIG. 7. The tension detecting part 73 is configured to calculate tension based on an output from the rotational speed sensor 41 by Equation (1) to be described. The water landing determining part 74 includes a non-accelerated state determining section 76, a non-accelerated time determining section 77, and a speed determining section 78 as functional components. The non-accelerated state determining section 76 is configured to determine that the rotational speed of the spool 12 is not being accelerated, i.e., a non-accelerated state other than acceleration (including constant speed rotation and decelerated rotation). The determination is executed based on the time-series outputs of the rotational speed sensor 41. The non-accelerated time determining section 77 is configured to determine whether or not the non-accelerated state has been continued for a predetermined period of time (e.g., 0.05 to 0.5 seconds). The speed determining section 78 is configured to determine whether or not the spool rotational speed ω of the spool 12 has reached a very low end speed ωe set as a reference for determining the water landing state. When the water landing determining part 74 determines that the terminal tackle is in the water landing state, the water landing informing part 75 is configured to convert the frequency for a duty control into an audible band frequency and rumble duty-related sound, i.e., duty control sound in order to inform of the determination result that the terminal tackle is in the water landing state.

The electric storage element 57 serves as a power source and uses, for instance, an electrolytic capacitor. The electric storage element 57 is connected to a rectifier circuit 58. The rectifier circuit 58 is connected to the switching element 63. The rectifier circuit 58 converts alternate current from the spool brake unit 40 into direct current and supplies the converted current to the electric storage element 57 while stabilizing voltage. Here, the spool brake unit 40 includes the rotor 60 and the coils 62, and functions as an electric generator.

It should be noted that the rectifier circuit 58 and the electric storage element 57 are also mounted to the circuit board 70. The respective components such as the coils 62 mounted to the circuit board 70 are covered with an insulator film 90 made of synthetic resin insulator. The insulator film 90 is formed in a brimmed cylindrical shape. The insulator film 90 covers the coils 62, the circuit board 70, and electric components mounted to the circuit board 70. It should be noted that the light emitter and the light receiver of the rotational speed sensor 41 are exposed through the insulator film 90.

Operation and Action of Actual Fishing

In casting, the clutch lever 17 is pressed down for switching the clutch mechanism 21 into a clutch-off state. In the clutch-off state, the spool 12 can be freely rotated. When casting is performed under the condition, the fishing line is reeled out of the spool 12 with high momentum due to the weight of the terminal tackle. When the spool 12 is rotated in casting, the magnets 61 are circulated on the inner peripheral side of the coils 62. Accordingly, the switching element 63 is turned on and the coils 62 are electrified. The spool 12 is thereby braked. In casting, the rotational speed of the spool 12 gradually increases and then gradually decreases after reaching its peak.

When the terminal tackle becomes the water landing state, the duty control sound rumbles and this enables an angler to determine that the terminal tackle lands on the water. In response, the angler rotates the handle 2 in the fishing-line winding direction. Accordingly, the clutch mechanism 21 is switched into the clutch-on state by the clutch return mechanism (not illustrated in the figures). The angler waits for fish bite the bait while holding the reel unit 1 in the palm under the condition.

Control Action of Control Unit

Figure 5:
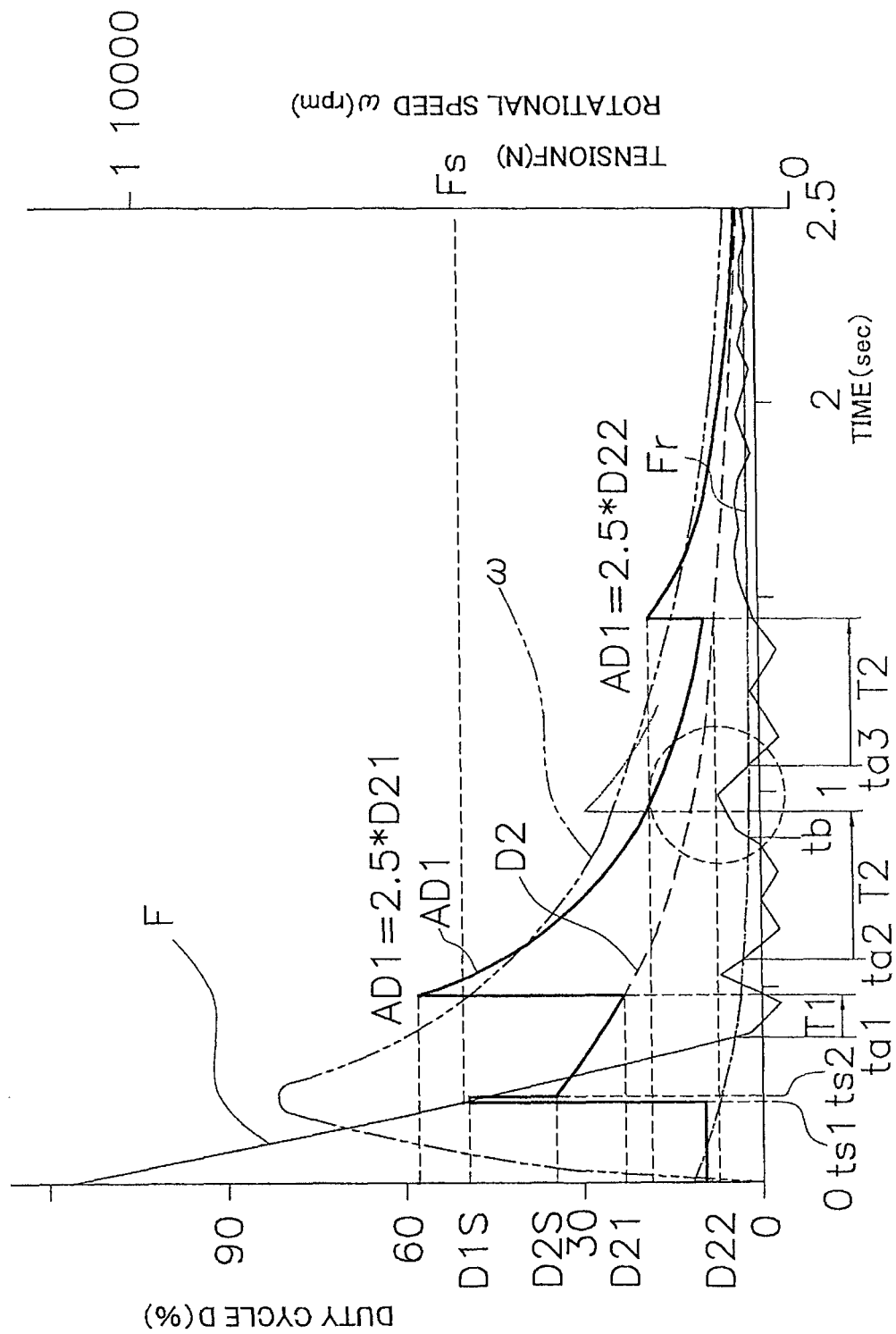
FIG. 5 is a chart for explaining a control action of the control unit.

Next, a brake control action performed by the control unit 55 in casting will be schematically explained with respect to FIG. 5. It should be noted that in FIG. 5, elapsed time since casting is represented in the horizontal axis, while duty cycle indicating magnitude of braking force, tension and rotational speed are represented in the vertical axis. Further, duty cycle actually applied in control (i.e., braking force) is depicted with a bold solid line.

When casting is started and the control unit 55 is powered on, a variety of items are set in the control unit 55 in accordance with the position of the mode knob 43. The items include a first initial braking force (duty cycle D1S) uniquely set for each brake mode in a first brake processing to be described, a second initial braking force (duty cycle D2S) uniquely set for each brake mode in a second brake processing to be described, a magnification MP (e.g., in a range of 1.2× to 2.5×) for a second braking force, an attenuation rate RA (e.g., 0.2 to 0.6) for the second braking force, and a timer value (e.g., in a range of 0.05 to 0.5 seconds) of a timer TN in correction braking. In addition, a reference tension Fr and a starting tension Fs are set in the control unit 55. The reference tension Fr is used as a comparative reference with respect to a tension F actually detected, whereas the starting tension Fs is used for determining the timing when braking is started. It should be noted that FIG. 5 is explained where the magnification MP for the second braking force AD1 is set to be to be 1.5, for instance.

Next, the rotational speed ω is read from the rotational speed sensor 41, and the tension F is calculated based on the rotational speed ω.

The tension F can be herein calculated by a change rate (Δω/Δt) of the rotational speed of the spool 12 and a moment of inertia J of the spool 12. When the rotational speed of the spool 12 varies in casting, the rotational speed is different from that of the spool 12 independently and freely rotating without receiving tension from the fishing line. The difference is attributed to the rotational driving force (i.e., torque) generated by the tension from the fishing line. A driving torque T can be herein expressed with the following equation (1), where the change rate of the rotational speed is set to be (Δω/Δt).

$$T = J \times (\Delta\omega/\Delta t) \quad (1)$$

When the driving torque T is calculated by the equation (1), the tension can be calculated based on the radius about a point of action of the fishing line (normally 15 to 20 mm).

Further, the following finding was obtained. A terminal tackle flips its position and stably flies before the rotational speed of the spool 12 reaches its peak, if large braking force is applied to the spool 12 when the tension, gradually decreasing since the starting of casting, becomes less than or equal to a predetermined value (i.e., the starting tension Fs). The following control is executed for allowing the terminal tackle to fly with a stable position by braking the spool 12 before the rotational speed of the spool 12 reaches its peak. Specifically, the first brake processing is executed for flipping the position of the terminal tackle by applying the strong braking force D1S for a short period of time (ts1 to ts2) in the beginning of casting. Subsequently, the spool 12 is gradually braked by the combination of the first braking force D2 that gradually decreases (depicted with a solid line up to a time ta1+T1 and with a broken line at and after the time ta1+T1 in FIG. 5) and the second braking force AD1 (depicted with a solid line at and after the time ta1+T1 in FIG. 5). Thus, braking of the spool 12 is continued until the water landing of the terminal tackle is determined. The first braking force D2 herein decreases from the braking force when braking is started in proportion to square of the rotational speed of the spool 12. Further, the second braking force AD1 decreases at the set attenuation rate RA from an initial value obtained by multiplying the first braking force D2 by the predetermined magnification MP.

The spool controlling part 72 is configured to execute the two types of brake processing, i.e., the first brake processing and the second brake processing. In the second brake processing, comparison is made between the reference tension Fr set to at least temporarily decrease over time and the detected tension F herein actually detected. When the detected tension F becomes less than or equal to the reference tension Fr, the spool 12 is braked with the second braking force. The second braking force is obtained by increasing the first braking force by a predetermined amount and attenuates at the attenuation rate RA. Specifically, the timer TN (N=1, 2, 3 . . . ) is actuated every time the detected tension becomes less than or equal to the reference tension. When the timer TN finishes counting, the spool 12 is braked with the second braking force AD1. The second braking force AD1 is herein obtained by increasing the first braking force D2 to be normally applied at the point of time when the timer TN finishes counting by a predetermined amount. It should be noted that the timer TN is configured to be reset when the detected tension F exceeds the reference tension Fr before the timer TN finishes counting. Further, the processing of obtaining the second braking force AD1 by increasing the first braking force D2 by a predetermined amount is not executed. In other words, the second braking force attenuates at the attenuation rate RA that has been set so far.

In FIG. 5, for instance, a timer T1 starts counting when the detected tension F becomes less than or equal to the reference tension Fr at a time ta1. Subsequently, the detected tension F remains less than or equal to the reference tension Fr until the timer T1 finishes counting. Therefore, the spool 12 is braked with the second braking force AD1 at the point of time when the timer T1 finishes counting. The second braking force AD1 is herein obtained by increasing a first braking force D21 to be normally applied at the point of time when the timer T1 finishes counting by a predetermined amount. At this time, the value of the second braking force AD1 is as follows.

$$AD1 = D21 + 1.5 \times D21 = 2.5 \times D21$$

Similarly, the detected tension F becomes again less than or equal to the reference tension Fr at a time ta2. In this case, however, the detected tension F exceeds the reference tension Fr at a time tb before a timer T2 finishes counting as represented within a circle depicted with a broken line in FIG. 5. Therefore, the processing of obtaining the second braking force by increasing the first braking force by a predetermined amount (which is depicted with a thin dashed two-dotted line at a time ta2+T2 in FIG. 5) is not executed. Further, the detected tension F becomes again less than or equal to the reference tension Fr at a time ta3. Subsequently, the detected tension F remains less than or equal to the reference tension Fr until the timer T2 finishes counting. Therefore, the processing of obtaining the second braking force AD1 by increasing the first braking force (D22) by a predetermined amount at the point of time when the timer T2 finishes counting. The spool 12 is thus braked with a braking force "D22+1.5×D22=2.5× D22". The second braking force herein attenuates at the attenuation rate RA over time. Further, the second braking force AD1 does not become less than or equal to the first braking force D2.

Figure 6:
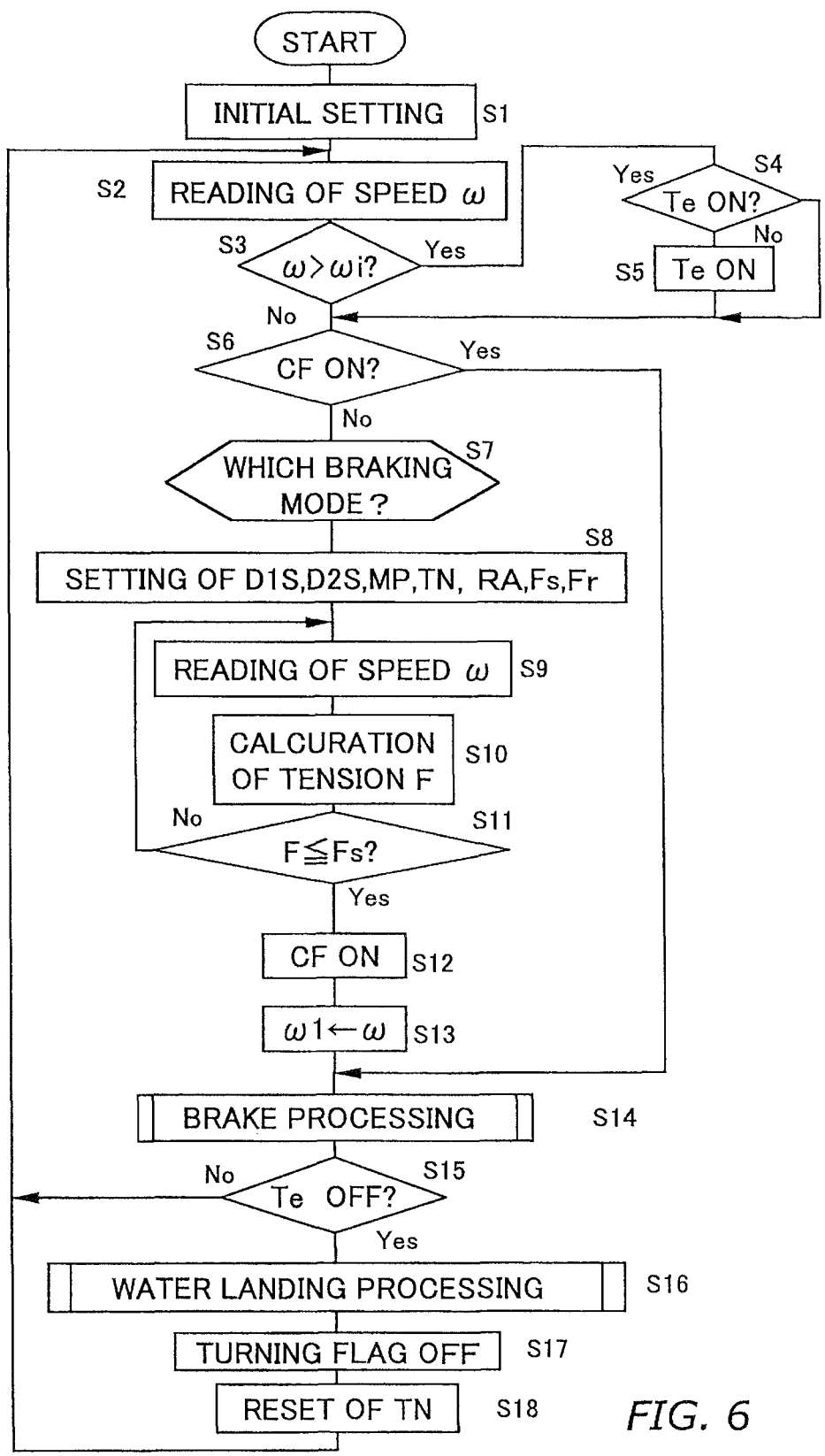
FIG. 6 is a flowchart for representing the control action of the control unit.

Next, a specific control processing will be explained with reference to a control flowchart represented by FIGS. 6, 7, and 8.

When the spool 12 is rotated in casting, electric power is stored in the electric storage element 57 and the control unit 55 is powered on. Accordingly, an initial setting is executed in Step S1. Further, a variety of flags and variables are herein reset. For example, a variable N, indicating actuated frequency of the timer TN, is set to be "1". In Step S2, to determine whether or not casting has been started, the rotational speed ω of the spool 12 is read by a pulse from the rotational speed sensor 41. In Step S3, it is determined whether or not casting was started, more specifically, whether or not the rotational speed ω exceeded a speed ωi as a speed for determining stating of casting. For example, the speed ωi is a rotational speed roughly in a range of 3,000 rpm to 6,000 rpm, and is herein set to be 5,000 rpm. The processing proceeds to Step S4 when it is determined that casting was started while the rotational speed ω exceeded 5,000 rpm. In Step S4, it is determined whether or not a timer Te, related to a condition to enter a water landing processing to be described, has been already started (turned on). The processing proceeds from Step S4 to Step S5 when the timer Te has not been turned on. In Step S5, the timer Te is turned on and is started. The processing proceeds to Step S6 when the timer Te has been already turned on. It should be noted that the timer Te is the one for counting a period of time from starting of casting until it is determined that the terminal tackle is in the water landing state. For example, the value of the timer Te can be set to be roughly 1.8 seconds to 2.5 seconds. In the present exemplary embodiment, the value of the timer Te is set to be 2 seconds. Therefore, in the present exemplary embodiment, it is determined whether or not the terminal tackle is in the water landing state when two seconds has been elapsed since starting of casting. The value (i.e., time) of the timer Te varies depending on the fishing brake modes. For example, the value of the timer Te in the L mode is set to be greater than the values of the timer Te in the other brake modes.

In Step S6, it is determined whether or not a flag CF has been turned on. The flag CF herein indicates whether or not a brake processing to be described has been started. The processing proceeds to Step S7 when it is determined that the brake processing has not been started yet. In Step S7, it is determined which of brake modes BMn ("n" is any one of the integers 1 to 4) is selected by the mode knob position sensor 45. In Step S8, the brake mode is set to be the selected one of the brake modes BMn. Specifically, a variety of values associated with the selected one of the brake modes BMn are read out from the ROM 55c of the control unit 55 and is set in the RAM 55b. For example, the values associated with the selected one of the brake modes BMn include the first initial braking force D1S in the first brake processing, the initial value D2S of the first braking force D2 (the second initial braking force D2S) in the second brake processing, the increase rate (magnification) MP of the second braking force AD1, respective timer values of the timer TN, the attenuation rate RA of the second braking force AD1, the reference tension Fr used for braking with the second braking force AD1, and so forth. It should be noted that the first initial braking force D1S is the duty cycle where the rotational speed of the spool 12 is 10,000 rpm in the initial stage of casting. Therefore, the first initial braking force D1S is corrected in accordance with the rotational speed of the spool 12 in the initial stage of casting. The timer TN (N: positive integer) is used as a plurality of timers configured to be sequentially actuated when the spool 12 is braked with the second braking force AD1 in the second brake processing. The timer values of the plural timers are set to be sequentially greater. For example, the timer value of the timer T1 is set to be 0.05 seconds, whereas the timer value of the timer T2 is set to be 0.1 seconds.

In Step S9, the rotational speed ω of the speed 12 is read in. In Step S10, the tension F, on the fishing line reeled out of the spool 12, is calculated based on the rotational speed ω using the aforementioned equation.

In Step S11, it is determined whether or not the calculated tension F is less than or equal to the starting tension Fs (e.g., any value in a range of 0.5 to 1.5N). The processing returns to Step S9 when the calculated tension F is greater than the starting tension Fs.

The processing proceeds to Step S12 when the tension F becomes less than or equal to the predetermined value Fs. In Step S12, the flag CF is turned on. In Step S13, the rotational speed ω, which is most recently detected in Step S9, is set as a rotational speed ω1 in the initial stage of casting. In Step S14, the brake processing represented in FIG. 7 is executed. In Step S15, it is determined whether or not the timer Te, with the terminal tackle being in the water landing state, has finished counting and has been turned off. The processing returns to Step S2 when the timer Te has not finished counting yet. The processing proceeds to Step S16 when the timer Te has finished counting and has been turned off. In Step S16, the water landing processing represented in FIG. 8 is executed. The processing proceeds to Step S17 when the water landing processing is finished.

In Step S17, all the flags are turned off. Then in Step S18, all the timers TN are reset, and the processing returns to Step S2.

Here, with reference back to Step S6, when it is determined that the flag CF has been turned on and the brake processing has been started, the processing skips ahead to Step S14.

Figure 7:
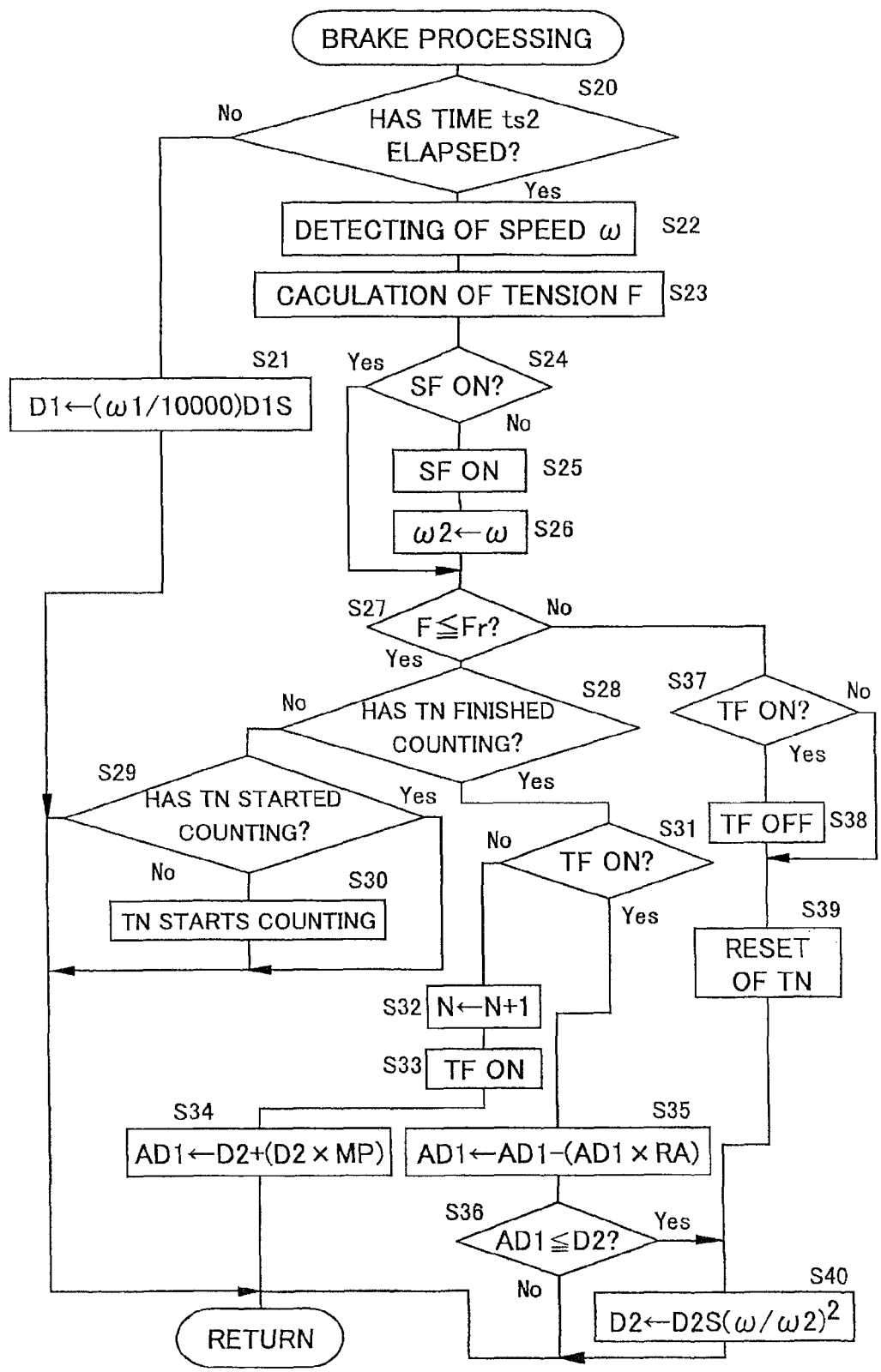
FIG. 7 is a flowchart for representing a brake processing in the control action.
Figure 8:
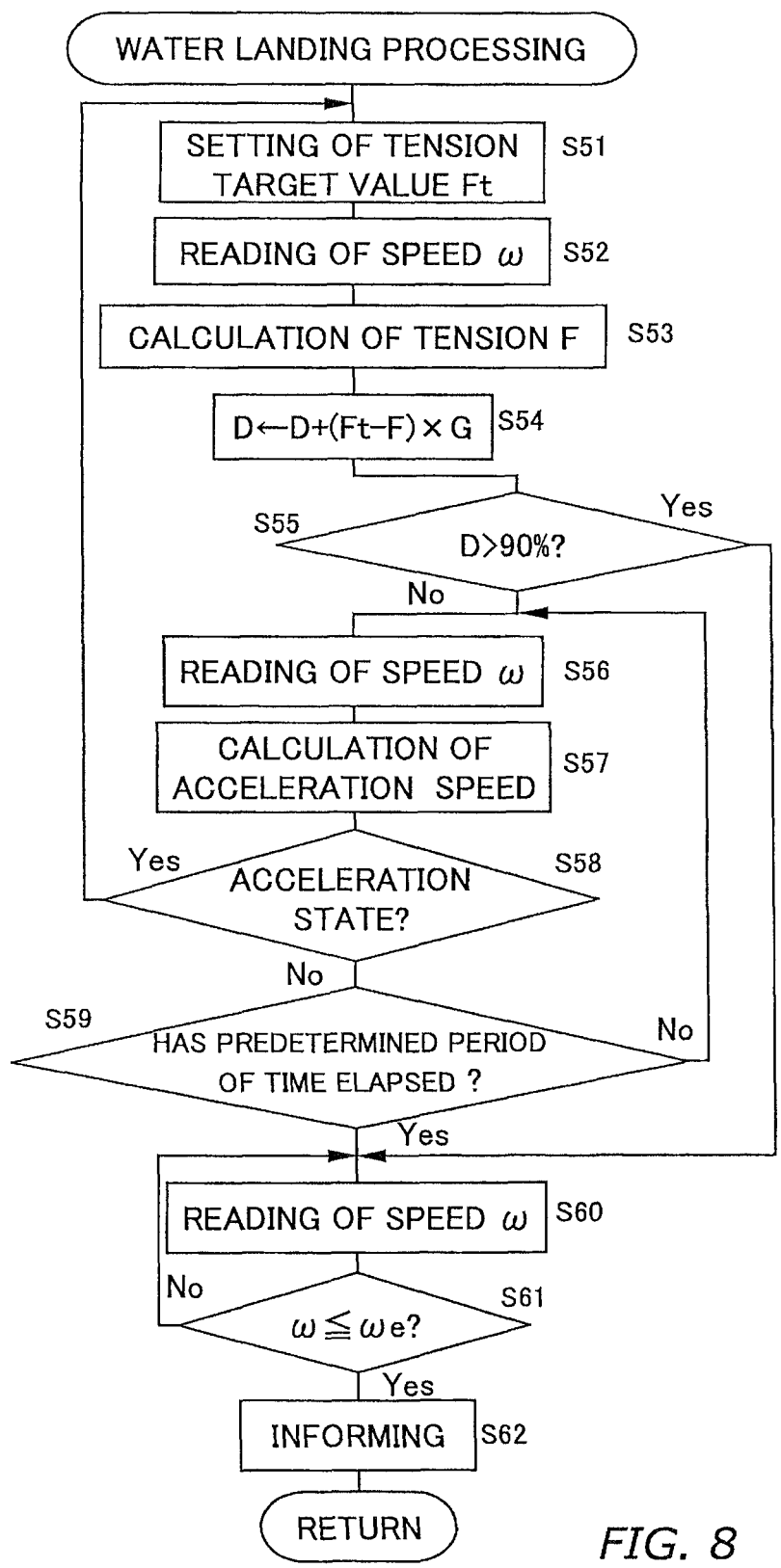
FIG. 8 is a flowchart for representing a water landing processing in the control action.

In Step S14, the brake processing is executed, and specifically in Step S20 of FIG. 7, it is determined whether or not a time ts2 has been elapsed after the detected tension F had become less than or equal to the predetermined value Fs. The processing proceeds to Step S21 unless the time ts2 has been elapsed. In Step S21, the first brake processing is executed, and the processing returns to Step S11. In the first brake processing of Step S21, as represented in FIG. 5, the first initial braking force D1S set in Step S8 is corrected in accordance with the rotational speed ω1 in the initial stage of casting, and the spool 12 is braked with constant braking force until the time ts2 is elapsed.

When it is determined that the time ts2 has been elapsed since starting of braking in Step S20, the processing proceeds to Step S22 and the second brake processing is executed. In Step S22, the rotational speed ω is detected. Next in Step S23, the tension F is calculated. Next in Step S24, it is determined whether or not a flag SF has been turned on. The flag SF is a flag for determining whether or not the second brake processing has been started. When it is determined that the flag SF has not been turned on yet in Step S24, the processing proceeds to Step S25 and the flag SF is turned on. Next in Step S26, the rotational speed ω detected in Step S22 is set as an initial rotational speed ω2 in the second brake processing. On the other hand, when it is determined that the flag SF has been turned on in Step S24, in other words, when the second brake processing has been started, the processing proceeds to Step S27.

In Step S27, it is determined whether or not the detected tension F is less than or equal to the reference tension Fr. When it is determined that the detected tension F is less than or equal to the reference tension Fr in Step S27, the processing proceeds to Step S28 for applying the second braking force. In Step S28, it is determined whether or not the timer TN (the first one is the timer T1) has finished counting. When it is determined that the timer TN has not finished counting yet in Step S28, the processing proceeds to Step S29. In Step S29, it is determined whether or not the timer TN has started counting. When it is determined that the timer TN has not started counting yet in Step S29, the processing proceeds to Step S30. In Step S30, the timer TN is actuated for starting counting and the processing returns to the main routine. When it is determined that the timer TN has started counting in Step S29, the processing skips Step S30 and returns to the main routine.

When it is determined that the timer TN has finished counting in Step S28, the processing proceeds to Step S31. In Step S31, it is determined whether or not a flag TF has been turned on. The flag TF herein indicates whether or not a correction brake processing is the one executed when the detected tension F became less than or equal to the reference tension Fr for the first time. When it is determined that the flag TF has not been turned on yet in Step S31, this is the first time for the correction brake processing. Therefore, the processing proceeds to Step S32 and the variable N is incremented by 1 for preparing the next timer TN (e.g., timer T2). Next in Step S33, the flag TF is turned on. Next in Step S34, the second braking force AD1 is set and the processing returns to the main routine. As represented in FIG. 5, the second braking force AD1 is set by multiplying the first braking force D2 when the timer TN finishes counting by the magnification MP (e.g., 1.5) and then by adding the multiplied first braking force D2 to the first braking force D2.

When it is determined that the flag TF has been turned on in Step S31, on the other hand, the processing proceeds to Step S35 and an attenuation processing of the second braking force AD1 is executed. Specifically, new second braking force AD1 is set by multiplying the second braking force AD1 to be normally applied at the point of time by the predetermined attenuation rate RA and then by subtracting the multiplied second braking force AD1 from the second braking force AD1 to be normally applied at the point of time. Next in Step S36, it is determined whether or not the attenuated second braking force AD1 is less than or equal to the first braking force D2 in order to prevent the second braking force AD1 from becoming weaker than the first braking force D2. When it is determined that the second braking force AD1 is less than or equal to the first braking force D2 in Step S36, the processing proceeds to Step S40 and a brake processing is executed with the first braking force D2.

When it is determined that the detected tension F is greater than the reference tension Fr in Step S27, on the other hand, the processing proceeds to Step S37. In Step S37, it is determined whether or not the flag TF has been turned on, in other words, whether or not the correction brake processing has been executed. When it is determined that the correction brake processing has been executed in Step S37, the processing proceeds to Step S38 and the flag TF is turned off. When it is determined that the correction brake processing has not been executed yet in Step S37, the processing skips the Step S38. Next in Step S39, the timer TN is reset and initialized. When the detected tension F exceeds the reference tension Fr before the timer TN is reset, the brake processing with the second braking force is thus configured to be cancelled while the timer TN is prevented from finishing counting.

Next in Step S40, the brake processing with the first braking force is executed. Then, the processing returns to the main routine. In the brake processing with the first braking force, the spool 12 is braked at a duty cycle obtained by reducing the second initial braking force D2S by the square of the rotational speed of the spool 12 (i.e., $D2=D2S (\omega/\omega 2)^2$).

The spool 12 is herein configured to be braked with the weak, first braking force D2 when the detected tension F exceeds the reference tension Fr. On the other hand, the spool 12 is configured to be braked with the strong, second braking force AD1, which is obtained by increasing the first braking force D2 by a predetermined amount, when the detected tension F becomes less than or equal to the reference tension Fr. Therefore, the strength of the braking force is automatically controlled in accordance with a fishing condition. In other words, it is not required to reset the strength of the braking force even when the fishing condition varies to some extent.

In the water landing processing of Step S16, a water landing determining processing and a water landing informing processing are executed. The water landing determining processing is the one for determining whether or not the terminal tackle is in the water landing state. The water landing informing processing is the one for informing of the fact that the terminal tackle is in the water landing state when it is determined that the terminal tackle is in the water landing state. In Step S51 of the water landing processing represented in FIG. 8, a tension target value Ft is set to determine braking force to be applied in auxiliary braking for determining whether or not the terminal tackle is in the water landing state. For example, the tension target value Ft is set by multiplying the value of the timer Te by a target coefficient, and for instance, is set to be roughly 0.1N. Therefore, the tension target value Ft is gradually increased with the elapsed time of casting. Next, in Step S52, the rotational speed ω of the spool 12 is read in. In Step S53, the tension F is calculated based on the read-in rotational speed ω. In Step S54, the braking force for determining that the terminal tackle is in the water landing state is set, and the spool 12 is braked with the set braking force for a predetermined period of time (e.g., 0.05 seconds to 0.3 seconds). It should be noted that in Step S54, a duty cycle D is set anew by subtracting the present tension F from the tension target value Ft (i.e., the resultant is Ft−F), then by multiplying the obtained value (Ft−F) by a gain G (i.e., the resultant is (Ft−F)×G) and by adding the obtained value ((Ft−F)×G) to the present duty cycle D (e.g., the first braking force D2 or the second braking force AD1). For example, the gain G is herein set as a value in a range of 1 to 3. When the braking is finished in Step S54, the processing proceeds to Step S55. Further, in Step S54, the duty control is executed with a control frequency inaudible to human ears, specifically, a control frequency of 1 kHz or less in an inaudible band. Accordingly, the duty control sound in the brake processing in Step S54 is inaudible to an angler's ear.

Next, in Step S55, it is determined whether or not the duty cycle D set in Step S54 exceeds 90%. When the duty cycle D is herein greater than 90%, the processing proceeds to Step S60 to be described. On the other hand, when the duty cycle D is herein less than or equal to 90%, the processing proceeds to Step S56. In Step S56, the rotational speed ω is read-in from the rotational speed sensor 41. In Step S57, an acceleration speed is calculated based on variation in the rotational speed ω over time. In Step S58, it is determined to which of the states (the accelerated state and the non-accelerated state) the calculated acceleration speed corresponds. In other words, it is determined to which of the states: the state that the rotational speed of the spool 12 is accelerated; and the state that the rotational speed of the spool 12 is either decelerated or constant, the calculated acceleration speed corresponds. When it is herein determined that the calculated acceleration speed corresponds to the accelerated speed, the processing returns to Step S51. On the other hand, when it is herein determined that the calculated acceleration speed corresponds to the non-accelerated state, the processing proceeds to Step S59. In Step S59, it is determined whether or not the non-accelerated state has been continued for a predetermined period of time (e.g., 0.05 seconds to 0.5 seconds). When it is herein determined that the non-accelerated state has not been continued for the predetermined period of time, the processing returns to Step S56.

On the other hand, when it is determined that the non-accelerated state has been continued for the predetermined period of time, the processing proceeds to Step S60. In Step S60, the rotational speed ω at the point of time is read in. In Step S61, it is determined whether or not the detected rotational speed ω is less than or equal to the low end speed cue as the reference for determining the water landing state (e.g., in a range of 4,000 rpm to 5,000 rpm). When the rotational speed ω is not reduced to the end speed ωe, the processing returned to Step S60. On the other hand, when the rotational speed ω is less than or equal to the end speed ωe, it is determined that the terminal tackle is in the water landing state and the processing proceeds to Step S62. In Step S62, for informing an angler of the fact that the terminal tackle is in the water landing state, the duty control sound is produced by braking the spool 12 at a predetermined duty cycle (e.g., a duty cycle of 90%) with a control frequency in an audible band (e.g., in a range from 1 kHz to 3 kHz) for a predetermined period of time (e.g., 1 seconds to 3 seconds). This enables an angler to recognize the water landing state of the terminal tackle even when the water landing of the terminal tackle cannot be visually confirmed in such a situation as fishing at night. Therefore, a thumbing operation, a clutch-on operation and so forth can be executed in good timing after the terminal tackle lands on the water. When the informing processing is finished in Step S62, the processing proceeds to Step S17 in FIG. 6.

In determining whether or not the terminal tackle lands on the water, braking force is herein instantly increased and it is determined whether or not the terminal tackle is in the water landing state based on the rotational speed of the spool 12 after releasing of the braking. Therefore, the spool brake mechanism 25 of the electrically controllable dual-bearing reel 100 is enabled to accurately determine that the terminal tackle lands on the water.

Further, when it is determined that the terminal tackle is in the water landing state, the duty control sound is arranged to rumble, and thereby, an angler can be informed of the fact that the terminal tackle is in the water landing state. This enables the angler to recognize the water landing of the terminal tackle even when the water landing of the terminal tackle cannot be visually confirmed in such a situation as fishing at night. Therefore, a thumbing operation and a clutch-on operation can be executed in good timing after the water landing of the terminal tackle.

Features

The aforementioned exemplary embodiment can be expressed as follows.

(A) The spool brake mechanism 25 is a device configured to brake the dual-bearing reel spool 12 capable of winding thereabout a fishing line having a terminal tackle attached to the tip thereof. The spool brake mechanism 25 includes the spool brake unit 40, the spool controlling part 72, the water landing determining part 74, and the water landing informing part 75. The spool brake unit 40 is configured to electrically brake the spool 12. The spool controlling part 72 is configured to electrically control the spool brake unit 40. The water landing determining part 74 is configured to determine that the terminal tackle is in the water landing state. When the water landing determining part 74 determines that the terminal tackle is in the water landing state, the water landing informing part 75 is configured to inform of the fact that the terminal tackle is in the water landing state.

In the spool brake mechanism 25, the spool controlling part 72 is configured to electrically control the spool brake unit 40 in conjunction with the casting by an angler. The spool 12 is thereby braked. When the water landing determining part 74 then determines that the terminal tackle is in the water landing state, the water landing informing part 75 is configured to inform of the fact that the terminal tackle is in the water landing state. Thus, when the terminal tackle is in the water landing state, the water landing state of the terminal tackle is informed. This enables an angler to easily recognize the water landing of the terminal tackle.

(B) The spool brake mechanism 25 further includes the rotational speed sensor 41 capable of detecting the rotational speed ω of the spool 12. The water landing determining part 74 is configured to cause the spool controlling part 72 to instantly brake the spool 12 in a predetermined timing after staring of casting with a braking force greater than a braking force to be normally applied at the point of time, and is configured to determine whether or not the terminal tackle is in the water landing state in accordance with a detected result of the rotational speed of the spool 12 after releasing of braking.

In this case, the spool controlling part 72 instantly brakes the spool in a predetermined timing after starting of casting with a braking force greater than a braking force to be normally applied at the point of time, and the water landing determining part 74 determines whether or not the terminal tackle is in the water landing state in accordance with the rotational speed of the spool 12 after releasing of braking. In determining whether or not the terminal tackle is in the water landing state, braking force is herein instantly increased and it is determined whether or not the terminal tackle is in the water landing state based on the subsequent rotational speed of the spool 12. Accordingly, the spool brake mechanism 25 of the electrically controllable dual-bearing reel is enabled to accurately determine whether or not the terminal tackle lands on the water.

(C) The spool brake mechanism 25 further includes the tension detecting part 73 configured to detect the tension on the fishing line. The water landing determining part 74 is configured to determine that a predetermined timing has come when the tension on the fishing line has been maintained with a predetermined value or less for a predetermined period of time or greater. In this case, the timing of increasing braking force is set utilizing the phenomenon that tension is reduced at the end stage of casting. Therefore, it is possible to further enhance accuracy in determining whether or not the terminal tackle lands on the water.

(D) In the spool brake mechanism 25, the water landing determining part 74 includes the non-accelerated state determining section 76 and the non-accelerated time determining section 77. The non-accelerated state determining section 76 is configured to determine whether or not the spool 12 is in the non-accelerated state, which indicates that the rotational speed of the spool 12 is not being accelerated, in accordance with the detected result of the rotational speed sensor 41 after releasing of braking. When the non-accelerated state determining section 76 determines that the spool 12 is in the non-accelerated state, the non-accelerated time determining section 77 is configured to determine whether or not the non-accelerated state has been continued for a predetermined period of time or greater. When the non-accelerated time determining section 77 determines that the non-accelerated state has been continued for a predetermined period of time or greater, the water landing determining part 74 is configured to determine that the terminal tackle is in the water landing state.

In this case, it is determined that the terminal tackle is in the water landing state when the spool 12 has been in the non-accelerated state for a predetermined period of time or greater while the state without tension has been maintained for a predetermined period of time or greater. Accordingly, it is possible to accurately determine whether or not the terminal tackle lands on the water.

(E) In the spool brake mechanism 25, the water landing determining part 74 includes the non-accelerated state determining section 76, the non-accelerated time determining section 77 and the speed determining section 78. The non-accelerated state determining section 76 is configured to determine whether or not the spool 12 is in the non-accelerated state, which indicates that the rotational speed of the spool 12 is not being accelerated, in accordance with the detected result of the rotational speed sensor 41 after releasing of braking. When the non-accelerated state determining section 76 determines that the spool 12 is in the non-accelerated state, the non-accelerated time determining section 77 is configured to determine whether or not the non-accelerated state has been continued for a predetermined period of time or greater. When the non-accelerated time determining section 77 determines that the non-accelerated state has been continued for a predetermined period of time or greater, the speed determining section 78 is configured to determine whether or not the rotational speed $\omega$ of the spool 12 is less than or equal to the predetermined speed $\omega e$. When the speed determining section 78 determines that the rotational speed $\omega$ is less than or equal to the predetermined speed $\omega e$, the water landing determining part 74 is configured to determine that the terminal tackle is in the water landing state.

In this case, it is determined that the terminal tackle is in the water landing state when the spool 12 has been maintained in the non-accelerated state for a predetermined period of time or greater; the state without tension has been maintained for a predetermined period of time or greater; and the rotational speed $\omega$ of the spool 12 is less than or equal to the predetermined speed $\omega e$. Thus, the determination of the rotational speed is added, and accordingly, it is possible to further accurately determine whether or not the terminal tackle lands on the water.

(F) In the spool brake mechanism 25, the water landing determining part 74 includes the non-accelerated state determining section 76 and the speed determining section 78. The non-accelerated state determining section 76 is configured to determine whether or not the spool 12 is in the non-accelerated state, which indicates that the spool 12 is not being accelerated, in accordance with the detected result of the rotational speed sensor 41 after releasing of braking. When the non-accelerated state determining section 76 determines that the spool 12 is in the non-accelerated state, the speed determining section 78 is configured to determine whether or not the rotational speed $\omega$ of the spool 12 is less than or equal to the predetermined speed $\omega e$. When the speed determining section 78 determines that the rotational speed $\omega$ is less than or equal to the predetermined speed $\omega e$, the water landing determining part 74 is configured to determine that the terminal tackle is in the water landing state. In this case, it is determined that the terminal tackle is in the water landing state when the spool 12 has been in the non-accelerated state for a predetermined period of time or greater while the rotational speed of the spool 12 is less than or equal to the predetermined speed. Accordingly, it is possible to further accurately determine whether or not the terminal tackle lands on the water.

(G) In the spool brake mechanism 25, the spool controlling part 72 is configured to control the spool brake unit 40 in accordance with the detected result of the tension detecting part 73. In this case, the spool 12 is braked by controlling tension. Therefore, the flying distance of the terminal tackle in casting can be prolonged.

(H) In the spool brake mechanism 25, the water landing informing part 75 is configured to inform of the water landing state of the terminal tackle by at least one of sound, light and vibration. In this case, an angler can determine the water landing state of the terminal tackle by at least one of sound, light and vibration.

Other Exemplary Embodiments

An exemplary embodiment of the present invention has been explained above. However, the present invention is not limited to the aforementioned exemplary embodiment, and a variety of changes can be herein made without departing from the scope of the present invention. Especially, a plurality of exemplary embodiments and modifications described in the present specification can be arbitrarily combined on an as-needed basis.

(a) In the aforementioned exemplary embodiments, the spool brake unit has been described that is configured to brake the spool by electric power generation. However, the spool brake unit can be of any types as long as it is electrically controllable. For example, the spool brake unit can be of a type that an electrically controllable actuator is configured to cause a single or plurality of brake shoes or a single or plurality of brake pads to make contact with a drum or a disc.

(b) In the aforementioned exemplary embodiment, the electrically controllable spool brake mechanism 25 is configured to brake the spool 12 by the combination of the first braking force D2 and the second braking force AD1. However, the present invention is not limited to the configuration. For example, the brake control can be executed by changing the rate of variation in braking force in accordance with the elapsed time of casting.

(c) In the aforementioned exemplary embodiment, the tension on the fishing line is configured to be calculated based on the rotational speed of the spool 12. However, the tension can be directly detected by, for instance, a strain gauge to be attached to the spool shaft 20.

(d) In the aforementioned exemplary embodiment, the water landing determining part 74 is configured to determine that the terminal tackle is in the water landing state when the rotational speed of the spool 12 is less than or equal to a predetermined rotational speed after the non-accelerated state continues for a predetermined period of time or greater. However, the present invention is not limited to the configuration. For example, the water landing determining part 74 can be configured to determine that the terminal tackle is in the water landing state at the point of time when the non-accelerated state has been continued for a predetermined period of time or greater. In this case, the processing in FIG. 8 is only required to omit performing the processing steps S60 and S61.

Alternatively, the speed determining section 78 can be configured to determine the rotational speed of the spool 12 every time the non-accelerated state is detected. When the rotational speed of the spool 12 is herein less than or equal to a predetermined rotational speed, the water landing determining part 74 can be configured to determine that the terminal tackle is in the water landing state. In this case, the processing in FIG. 8 is only required to omit the determination step S59 and return to Step S56 from Step S61 without returning to Step 60 from Step S61.

(e) In the aforementioned exemplary embodiment, the water landing of the terminal tackle is configured to be informed by duty control sound to be produced by changing the control frequency of the duty control into an audible band frequency. However, the present invention is not limited to the configuration. For example, the water landing of the terminal tackle can be configured to be informed by light (e.g., lighting of a lamp or display of an indicator) and/or vibration of a vibrator.

Further, when informed by sound, the water landing of the terminal tackle can be informed not by duty control sound but by sound to be produced by a sounding unit (e.g., a buzzer) to be provided.

Advantageous Effects of Invention

According to the present invention, the water landing state of a terminal tackle is configured to be informed. This enables an angler to easily recognize the water landing of the terminal tackle. It should be noted that the term "the water landing state of a terminal tackle" herein refers to a state of a terminal tackle between immediately before water landing and immediately after water landing. Further, backlash tends to easily occur in this state.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A spool brake device for a dual-bearing reel, the spool brake device configured to brake a spool capable of winding thereabout a fishing line having a terminal tackle attached to a tip thereof, the spool brake device comprising:
   a spool braking part configured to electrically brake the spool;
   a spool controlling part configured to electrically control the spool braking part;
   a water landing determining part configured to determine whether or not the terminal tackle is in a water landing state indicating that the terminal tackle is in water;
   a rotational speed detecting part configured to detect a rotational speed of the spool; and
   a water landing informing part configured to inform of the water landing state of the terminal tackle when the water landing determining part determines that the terminal tackle is in the water landing state, and including a non-accelerated state determining section configured to determine whether or not the spool is in a non-accelerated state, based on the detection result of the rotational speed detecting part, the non-accelerated state indicating that the spool is not being accelerated, and a non-accelerated time determining section configured to determine whether or not the non-acceleration state has been maintained for a predetermined period of time or greater when the non-accelerated state determining section determines that the spool is in the non-accelerated state, and the water landing determining part being configured to determine that the terminal tackle is in the water landing state when the non-accelerated time determining section determines that the non-accelerated state has been maintained for the predetermined period of time or greater.

2. The spool brake device for a dual-bearing reel according to claim 1,
   wherein
   the water landing determining part is configured to cause the spool braking part to brake the spool in a predetermined timing after starting of casting with a braking force greater than a predetermined braking force and is configured to determine whether or not the terminal tackle is in the water landing state in accordance with a detection result of the rotational speed after releasing of braking.

3. The spool brake device for a dual-bearing reel according to claim 2, further comprising
   a tension detecting part configured to detect a tension on the fishing line, wherein
   the water landing determining part is configured to determine that the predetermined timing has come when the tension on the fishing line has been maintained with a predetermined value or less for a predetermined period of time or greater.

4. The spool brake device for a dual-bearing reel according to claim 3, wherein
the spool controlling part is configured to control the spool braking part in accordance with a detection result of the tension detecting part for detecting the tension on the fishing line.

5. The spool brake device for a dual-bearing reel according to claim 2, wherein
the water landing determining part includes
a non-accelerated state determining section configured to determine whether or not the spool is in a non-accelerated state based on the detection result of the rotational speed detecting part after releasing of braking, the non-accelerated state indicating that the spool is not being accelerated;
a non-accelerated time determining section configured to determine whether or not the non-accelerated state has been maintained for a predetermined period of time or greater when the non-accelerated state determining section determines that the spool is in the non-accelerated state; and
a speed determining section configured to determine whether or not the rotational speed of the spool is less than or equal to a predetermined speed when the non-accelerated time determining section determines that the non-accelerated state has been maintained for the predetermined period of time or greater, and
the water landing determining part is configured to determine that the terminal tackle is in the water landing state when the speed determining section determines that the rotational speed of the spool is less than or equal to the predetermined speed.

6. The spool brake device for a dual-bearing reel according to claim 2, wherein
the water landing determining part includes
a non-accelerated state determining section configured to determine whether or not the spool is in a non-accelerated state based on the detection result of the rotational speed detecting part after releasing of braking, the non-accelerated state indicating that the spool is not being accelerated; and
a speed determining section configured to determine whether or not the rotational speed of the spool is less than or equal to a predetermined speed when the non-accelerated state determining section determines that the spool is in the non-accelerated state, and
the water landing determining part is configured to determine that the terminal tackle is in the water landing state when the speed determining section determines that the rotational speed of the spool is less than or equal to the predetermined speed.

7. The spool brake device for a dual-bearing reel according to claim 1, wherein
the water landing informing part is configured to inform of the water landing state of the terminal tackle by at least one of sound, light, and vibration.

* * * * *